United States Patent [19]

Yamada et al.

[11] Patent Number: 4,788,609
[45] Date of Patent: Nov. 29, 1988

[54] DRIVING POWER SWITCHING MECHANISM FOR CASSETTE TAPE REPRODUCING APPARATUS

[75] Inventors: Kimitika Yamada; Hidenori Muramatsu; Katsuya Nozawa; Yoshihiko Goto, all of Tokyo, Japan

[73] Assignee: Clarion Co., Ltd., Tokyo, Japan

[21] Appl. No.: 788,249

[22] Filed: Oct. 17, 1985

[30] Foreign Application Priority Data

Oct. 19, 1984 [JP] Japan .................. 59-220237
Mar. 25, 1985 [JP] Japan .................. 60-61178

[51] Int. Cl.[4] .............................. G11B 5/027
[52] U.S. Cl. ........................... 360/85; 360/95
[58] Field of Search ........... 360/85, 83, 84, 95, 360/96.5, 93

[56] References Cited

U.S. PATENT DOCUMENTS

| | | | |
|---|---|---|---|
| 3,882,542 | 5/1975 | Nakamichi | 360/96.5 X |
| 4,479,155 | 10/1984 | Takai et al. | 360/96.5 |
| 4,586,096 | 4/1986 | Okada | 360/96.5 |
| 4,611,251 | 9/1986 | Yokoo | 360/85 |
| 4,685,009 | 8/1987 | Min et al. | 360/95 |

FOREIGN PATENT DOCUMENTS 0135472  8/1982  Japan ........................ 360/95

*Primary Examiner*—Robert S. Tupper
*Assistant Examiner*—Andrew L. Sniezek
*Attorney, Agent, or Firm*—Wallenstein, Wagner, Hattis & Strampel, Ltd.

[57] ABSTRACT

A video tape recorder includes a pinch roller mechanism driven by a capstan motor to closely fit to a capstan a tape running from a rotary head. The tape is driven in a selected mode by a reel mechanism driven by a tape loading motor. Different mechanisms and members of the recorder are activated at proper relative timings which are established by a timing control mechanism driven by the capstan motor.

3 Claims, 17 Drawing Sheets

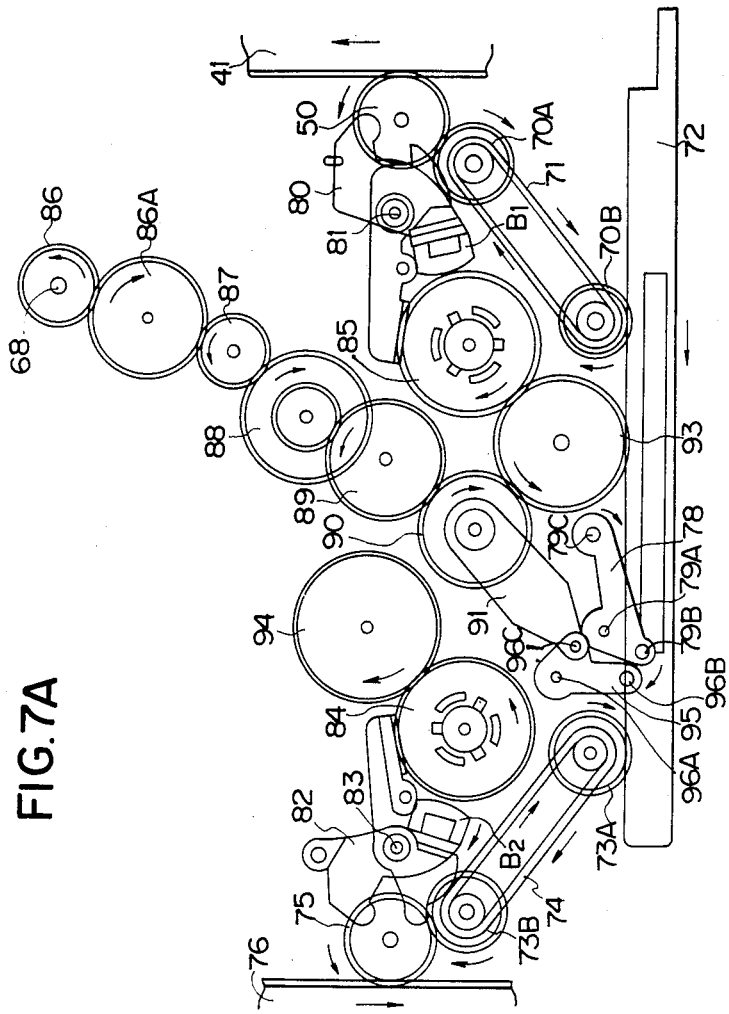
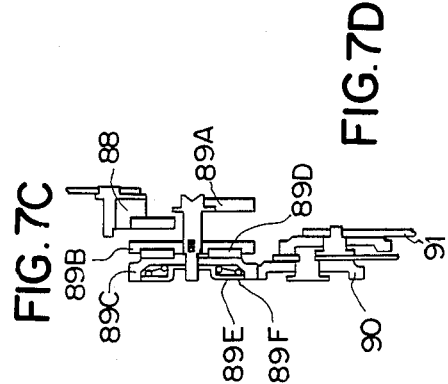
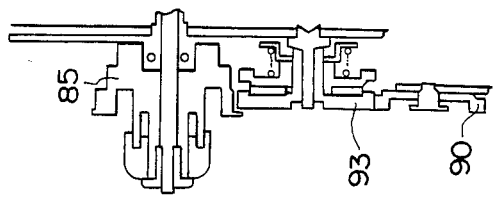

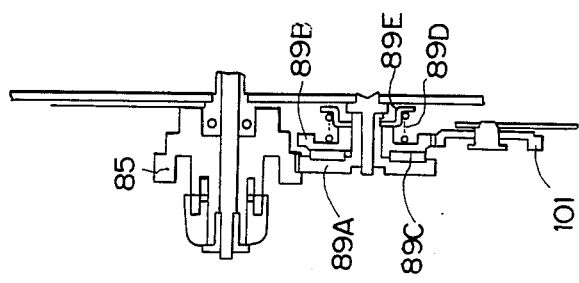
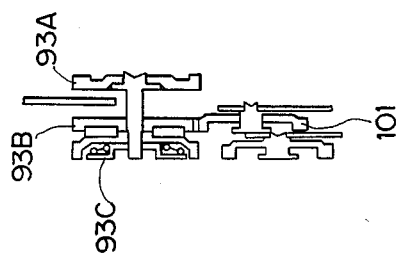
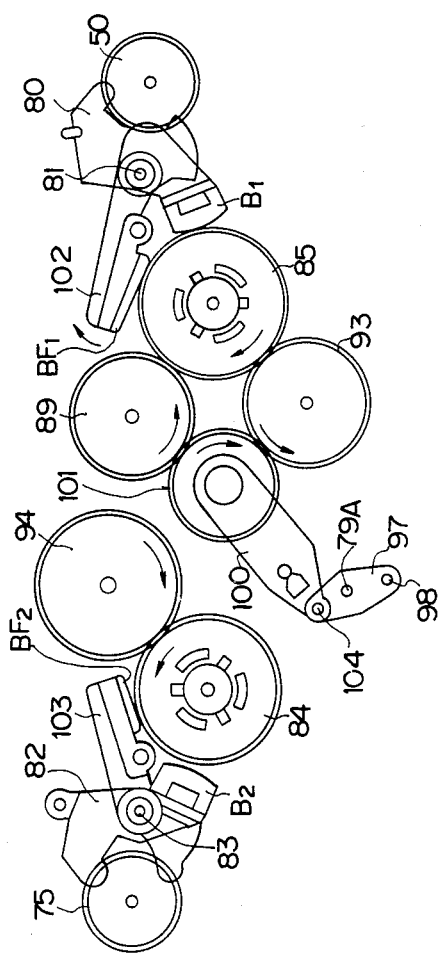

FIG.15
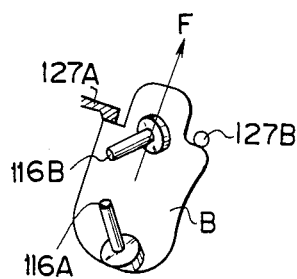
FIG.16A  FIG.16B
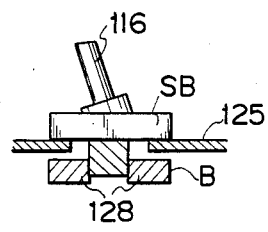 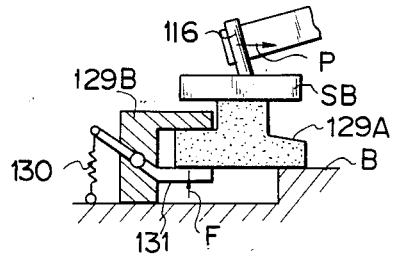
FIG.17
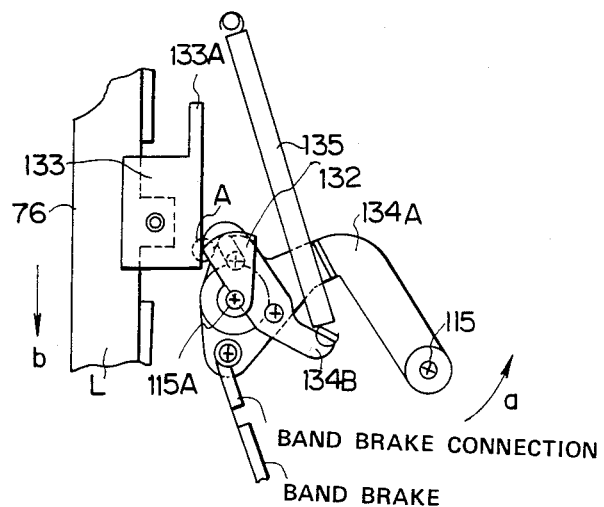

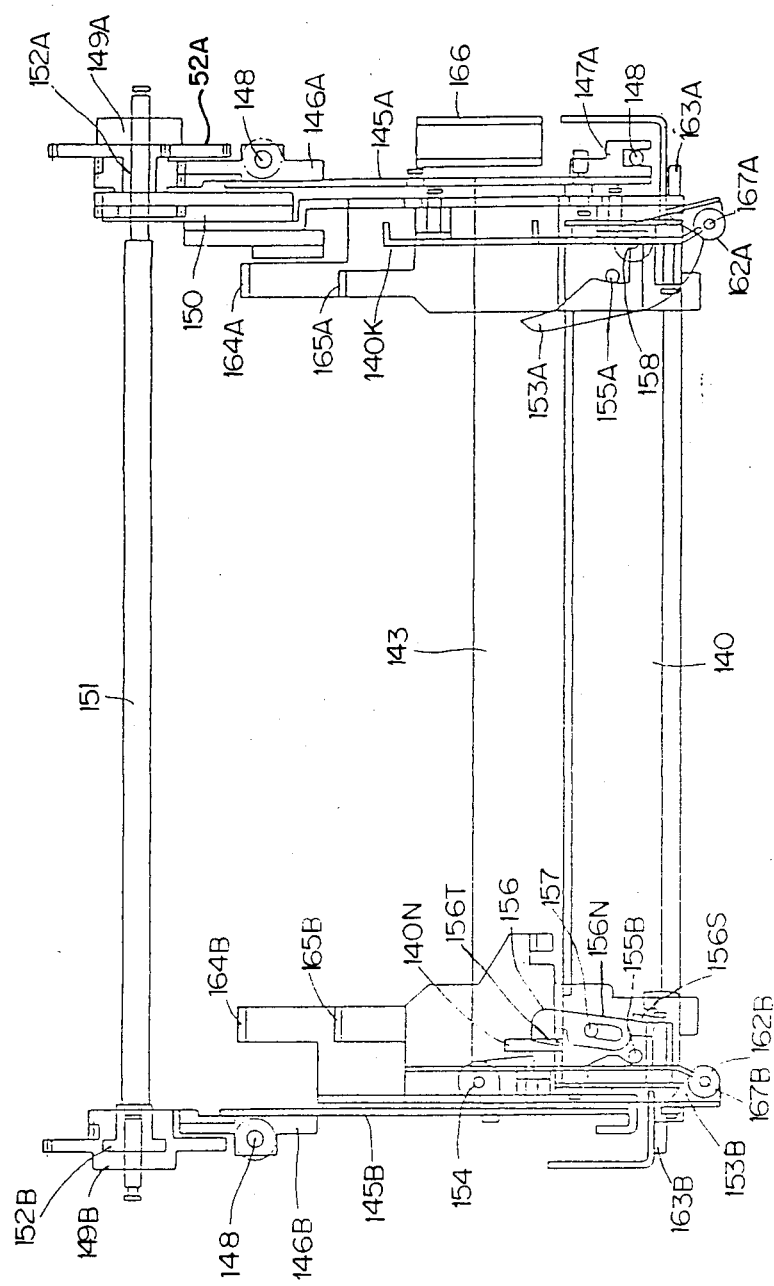

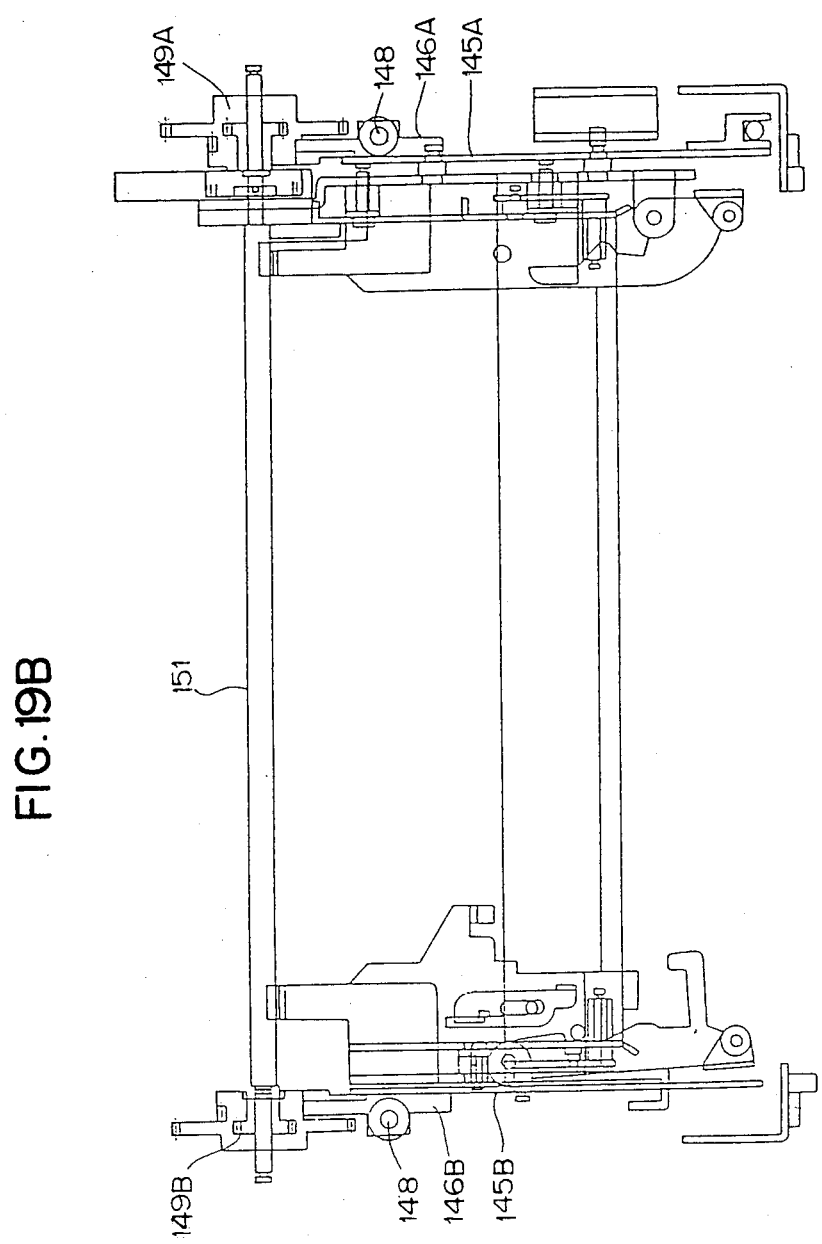

4,788,609

DRIVING POWER SWITCHING MECHANISM FOR CASSETTE TAPE REPRODUCING APPARATUS

FIELD OF THE INVENTION

This invention relates to a compact video tape recorder using a video tape eight millimeters (8 mm) or ½ inch wide.

BACKGROUND OF THE INVENTION

Considering that old standardized video tape recorders for a tape ½ inch wide had substantially reached the limit of reduction in size and weight thereof, the industry has recently standardized video tape recorders for a tape eight millimeters (8 mm) wide. However, there still remains much of room for improvement 8 mm and ½" video tape recorders.

OBJECT OF THE INVENTION

It is therefore an object of the invention to provide a video tape recorder for either or ½" tapes which is simplified in construction and reduced in size and weight.

SUMMARY OF THE INVENTION

In accordance with the invention, there is provided a video tape recorder comprising:
 a rotary head;
 a cassette holder mechanism driven by a first drive source to locate a video cassette at a predetermined recording and reproducing position in said video tape recorder;
 a tape loading mechanism for pulling a tape out of said video cassette in said position and putting the tape along a predetermined tape path including a circumferential periphery of said rotary head;
 a pinch roller mechanism driven by said first drive source to closely fit to a capstan said tape running from said rotary head;
 a reel mechanism driven by a second drive source to drive said tape in a selected mode; and
 a timing control mechanism driven by said first drive source to control when to activate different members of said mechanisms.

The invention is described hereinbelow in detail, referring a preferred embodiment illustrated in the drawings.

BRIEF DESCRIPTION OF THE DRAWINGS

FIGS. 1 through 19 illustrate an embodiment of the invention, in which:
FIGS. 1, 3, 5(a), (b), 6, 7(a), 8(a), (b), 9(a), (b), 10(a), (b), 11, 12, 13, 15, 17, 18(b) and 19(b) are plan views;
FIG. 2 is a timing chart;
FIGS. 4, 7(c), (d), 8(b), (c), 14(b), 16(a), (b), 18(a), (c), and 19(a), (b) are side views;
FIG. 7(b) is a side elevation.

DETAILED DESCRIPTION

Figure 1:
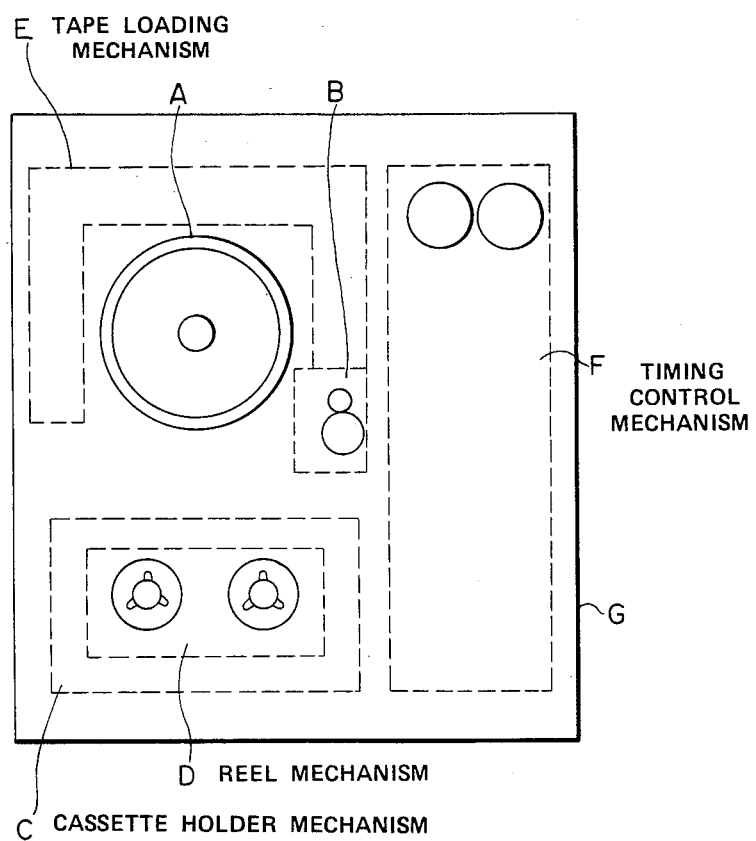

FIG. 1 is a schematic plan view of a video tape recorder generally comprising a rotary head cylinder A, pinch roller mechanism B driven by a first drive source to closely hold to a capstan a tape running from the head cylinder A, a cassette holder mechanism C for receiving a video tape cassette and bringint it to a position when driven by the first drive source, a reel mechanism D driven by a second drive source to drive a tape of the cassette in a selected mode, a tape loading mechanism E for pulling the tape out of the cassette and putting it along a predetermined tape path including the circumferential peripheray of the head cylinder and a timing control mechanism F driven by the first drive source to control when to activate different constituent members of the player. These mechanisms A through F are all mounted on a single chassis G.

Figure 2:
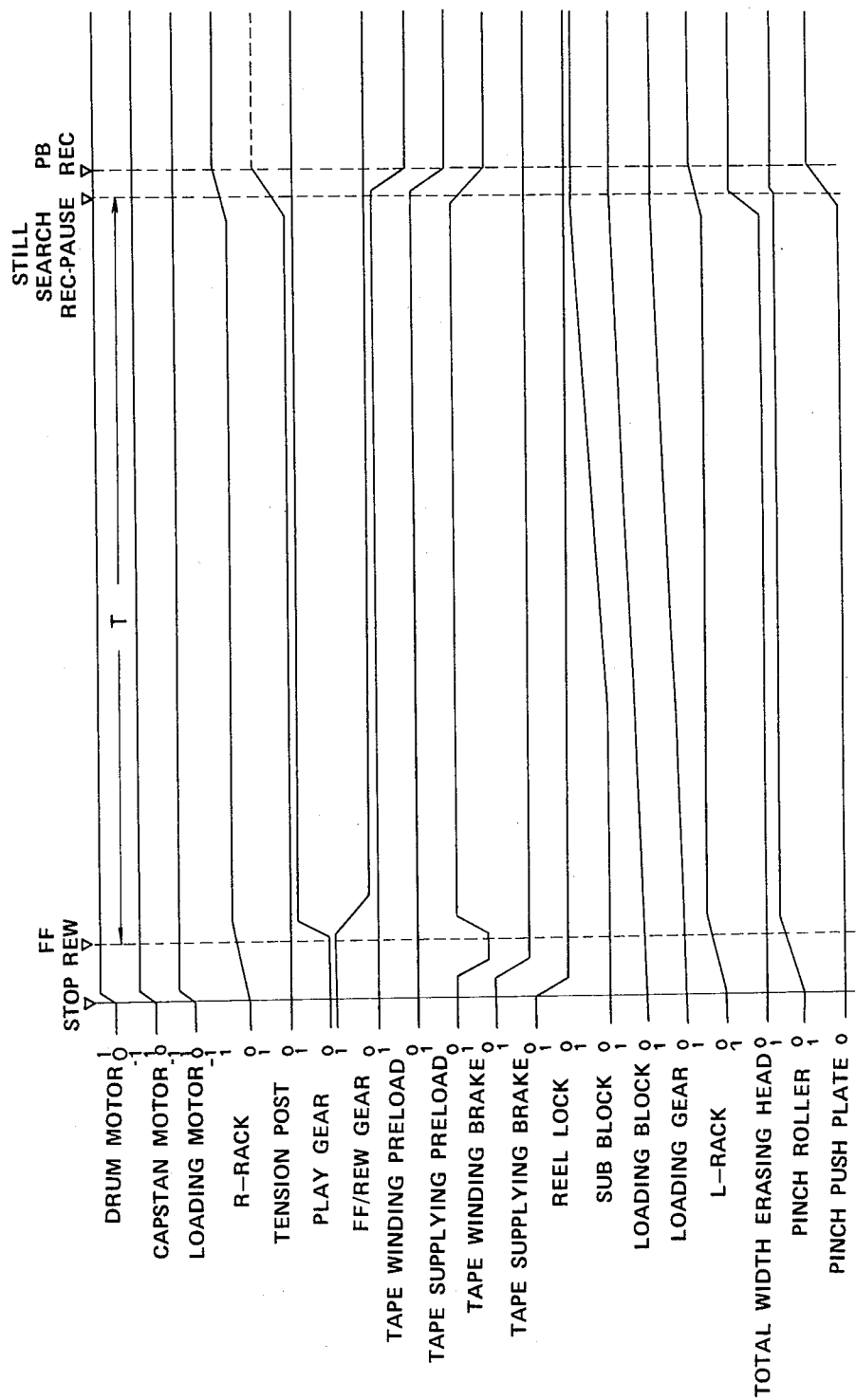

The mechanism related to the tape loading operation of the recorder are described hereinbelow, also referring to FIG. 2 which is a timing chart showing when important members or parts of the mechanisms are activated. In FIG. 2, level "1" designates "on" state, and level "0" shows "off" state. As to motors, level "1" indicates that a given motor is rotated in a direction for loading, level "0" shows the motor is stopped, and level "−1" shows the motor is rotated in a reverse direction for unloading.

Figure 3:
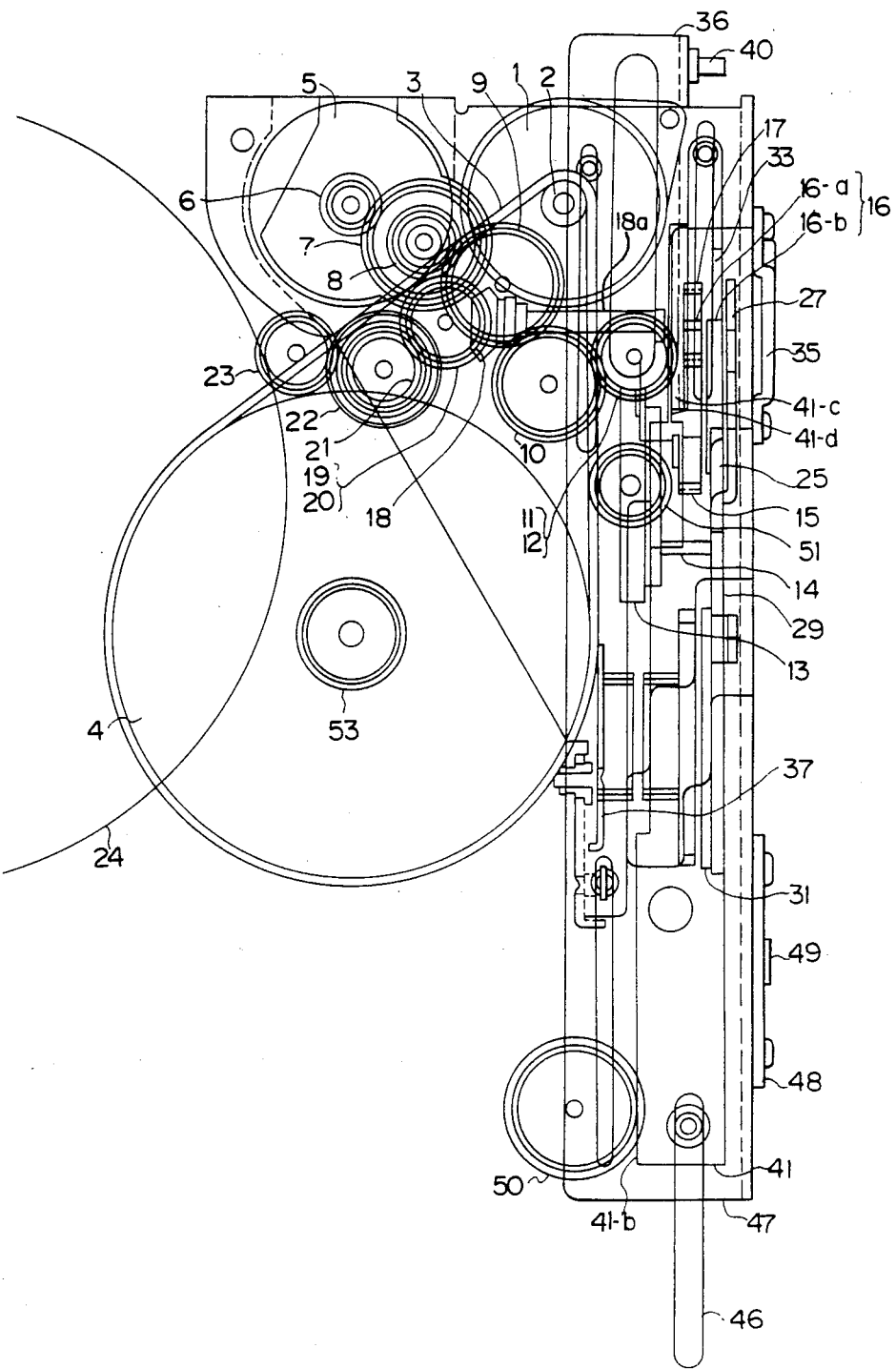
Figure 4:
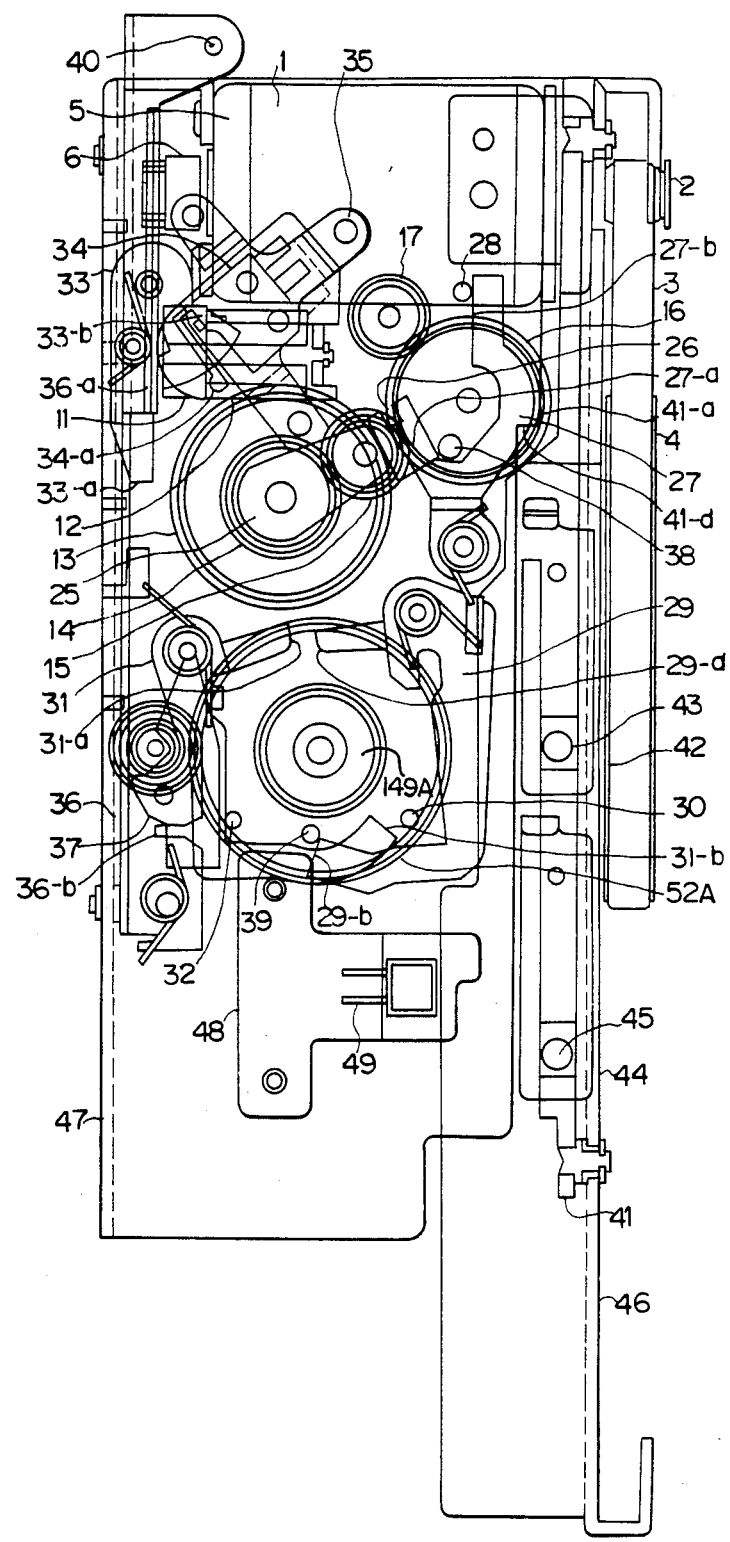

(1) Timing Control Mechanism F:

FIGS. 3 and 4 are a plan view and a right side view of the timing control mechanism upon completion of a tape loading operation.

FIGS. 3 and 4 show a capstan motor 1, motor pulley 2, flat belt 3, capstan pulley 4, loading motor 5, motor gear 6, gear 7, gear 8, gear 9, gear 10 and gear 11.

The drawings further show a worm 12, worm wheel 13, central gear 14, planetary gear 15, clutch gears 16a and 16b, gear 17, bevel gear 18, bevel gear 19, gear 20, gear 21, gear 22, gear 23, gear (loading gear) 24, planet arm 25, and planet stopper 26.

FIGS. 3 and 4 further show a changeover plate 27, stopper 28 for the changeover plate, changeover plate 29, stopper 30 for the changeover plate, changeover plate 31, stopper 32 for the changeover plate, changeover plate 33, switch 34 (eject switch), switch bracket 35, eject rack 36, eject rack check plate 37, changeover pin 38, changeover pin 39, and changeover pin 40.

FIGS. 3 and 4 further show rack plates (a, b, c, d) a, 41a 41B, 41c, 41d, click plate spring 42, click ball 43, click plate spring 44, click ball 45, main chassis 46, gear housing plate 47, printed board 48, tape end sensor 49, and gears 50 through 54.

In the timing chart of FIG. 2, the abscissa shows the rotation angle of the gear K (loading gear) 24 which winds a tape on the rotary head cylinder A (FIG. 1).

The loading motor 5 is rotatable in two opposite directions so that it is rotated in a first direction for tape loading and in a second direction for tape unloading. The rotation of the loading motor 5 is transmitted to the gear 6 coaxial with the motor 5, gear 7 and 8 coaxial with each other, and gears 9, 10 and 11.

The direction of the rotation is changed by a right angle transmitted from the worm 12 coaxial with the gear 11 to the worm wheel 13. The rotation is thereafter transmitted to the central gear 14 and the planetary gear 15. The planet arm 25 engages between the gears 14 and 15, and is rotated by a spring connected between the worm wheel 13 and the gear 14 and by a friction mechanism comprising a felt member. The stopper 26 limits the rotation of the plane arm 25, so that the rotation is transmitted from the plant gear 15 to the clutch gear 16a. During this time, the friction mechanism continues to slip.

The plant stopper 26 is made by partly cutting the gear housing plate 47 and bending it upward.

The clutch gear system 16 has a clutch mechanism to bring the gear 16b into rotatable engagement with the gear 16a only after the gear 16a is rotated by a predetermined angle.

The rotation transmitted to the clutch gear 16a is further transmitted to the bevel gears 18 and 19, to the gears 20 and 21, to gears 22 and 23, and to the loading gear (gear K) 24. Therefore, as shown in FIG. 2, the loading gear 24 starts its rotation in synchronization with initiation of movement of the loading motor 5 to cause displacement of guide rollers, tilt posts, etc. (described later in a detailed explanation of a loading operation).

The other clutch gear 16b starts its rotation after the clutch gear 16a is rotated by a predetermined angle. This relationship is established by the rack plate (right rack plate) 41. More specifically, the clutch gear 16a engages an opposed surface of the rack plate 41 and is elevated upward concurrently with the start of rotation of the loading motor 5. After the rack plate 41 is elevated by an amount corresponding to 25 degrees rotation, for exasmple, of the loading gear 24, the rack plate has no more gears formed thereon, and stops the upward movement. Due to this, the clutch gear 16b engaging the clutch gear 16a via the rack plate 41 cannot receive any rotation and therefore stops, too.

After the clutch gear 16a is rotated by a predetermined angle such as two full revolutions and a half (corresponding to 235 degrees), it engages the clutch gear 16b so that the latter starts rotating a predetermined time later and elevates the rack plate 41a again. The duration T wherein the clutch gear 16b remains still, i.e. the rack plate 41 is not elevated, is shown in FIG. 2 as a pause period which occupies most part of STOP-PB (REC) cycle during tape loading.

The up and down movement of the rack plate 41 is an important factor which determines when to activate different members in other mechanisms.

The gear 50 engages a portion of the rack plate 41b to transmit the movement to other mechanisms, and the gear 51 engages the clutch plate portions 41c of the rack plate 41 to transmit the movement to other mechanisms.

The pause period T is reserved so that PB (playback) or REC (recording) is effected only after a tape takes the proper position with respect to the rotary head and never before.

Detection of an electric signal indicative of completion of a tape loading is effected by a mode detecting switch controlled by a left rack plate of a tape loading mechanism which will be described later.

Since the rack plate 41 is free from both clutch gears 16a and 16b during the pause period, the click plate spring 42 and 44 and click balls 43 and 45 are provided to prevent misoperation caused by vibration, etc. of the rack plate 41.

Change of the system from completion of a tape loading operation of FIGS. 3 and 4 to unloading of a tape cassette is described hereinbelow.

When the loading motor 5 starts reverse rotation, the rotation transmitted from the gear 6 up to the gears 13 and 14 tries to rotate the plant arm 25 in the opposite direction. However, the changeover plate 27a prevents this. Therefore, the rotation from the planetary gear 15 is transmitted to the clutch gear assembly 16, so that the clutch gear 16a transmits it up to the loading gear 24 in the same fashion described above, and the clutch gear 16b effects a predetermined operation via the transmitting system starting from the rack plate 41, at a timing related to the movement of the clutch gear 16a. Concurrently, the tape is unloaded by a changeover pin 38 fixed to the clutch gear 16b. The changeover plate 27b is pushed in, responsively to the unloading, and releases the planet arm 25, heretofore maintained unrotatable, to allow it to freely rotate thereafter. Thus the plane tarm 25 effects the reverse rotation in the unloading direction, and is thereafter stopped by the changeover plate 31c again. Therefore the rotation from the planetary gear 15 is transmitted to another mechanism, i.e. a cassette holder mechanism via the gear 52A, and the cassette holder mechanism is actuated to unload the video cassette.

The changeover pin 39 integrally formed on the gear 52A pushes the changeover plate 31b in response to the unloading reverse rotation, and the planet arm 25 heretofore maintained immovable by the changeover plate portion 31a is allowed to rotate. During loading operation of the cassette holder mechanism, a similar operation is effected by the changeover plate 29, and explanation thereof is omitted here.

The changeover stoppers 28, 30 and 32 are associated with the changeover plates 27, 29 and 31, respectively, and are disposed on the gear housing plate 47.

After the planet arm 25 is released from the changeover plate 31 upon unloading by the cassette holder mechanism, it is blocked again by the changeover plate 33a. Therefore, the planetary gear 15 should engage the eject rack 36a. It will be seem that the positional relationship illustrated unables this engagement.

Although the actual positional relationship is not illustrated, a projection 140K of a member in the cassette holder mechanism and an opening of the eject rack 36b are engaged together and moved to a predetermined position (for engagement with the planet gear 15) upon unloading by the cassette holder mechanism. Movements of the eject racks 36 and 36a caused by the planetary gear 15 convey the cassette holder mechanism to a position for full ejection.

Responsively to the movement of the cassette holder mechanism, the changeover pin 40 integrally mounted on the eject rack 36 pushes the changeover plate 33b to rotatably release the plane tarm 25 heretofore blocked by the changeover plate 33a. The planet arm 25 further rotates until depressing the changeover switch 34a, i.e. eject switch, to generate a signal for deenergizing the loading motor 5.

The depression and closure of the changeover switch 34a corresponds to the start of forward rotation of the loading motor 5. More specifically, if an instruction for establishing the playback mode, for example, is received the loading motor 5 starts rotating in the forward direction responsively. The forward rotation brings the planet arm 25 near the changeover plate 31 because the planet arm 25 is not blocked by adjacent members including the changeover plate 33. The movement of the planet arm 25, however, is blocked by the changeover plate 29a. The drawings show the system upon completion of an unloading operation where the changeover plate 29b is pushed in, and the changeover plate 29a does not check the planet arm 25.

The operation effected after this is similar to that described before.

The eject rack check plate 37 is provided to temporarily disturb movement of the eject rack 36. The tape end sensor 49 is a light sensing member for detecting tape ends of a video cassette, and is fixed to a printed board 48 secured to the gear housing plate 47.

The main chassis 46 carries thereon different members of the video tape recorder, including the gear housing plate 47.

Coaxially with the capstan motor 1 is provided the motor pulley 2 which engages the capstan pulley 4 via the flat belt 3. Rotation of the capstan motor 1 is used to feed a tape which is closely sandwiched by the capstan shaft and the pinch roller, and also transmitted to a reel mechanism via the gear 53 which is integral with the capstan pulley 4.

The changeover switch 34 is mounted on the bracket 35 which is fixed to the gear housing plate 47.

The projection 41d of the rack plate 41 is provided to lift a pinch cam plate 61 which will be described later.

Figure 5A:
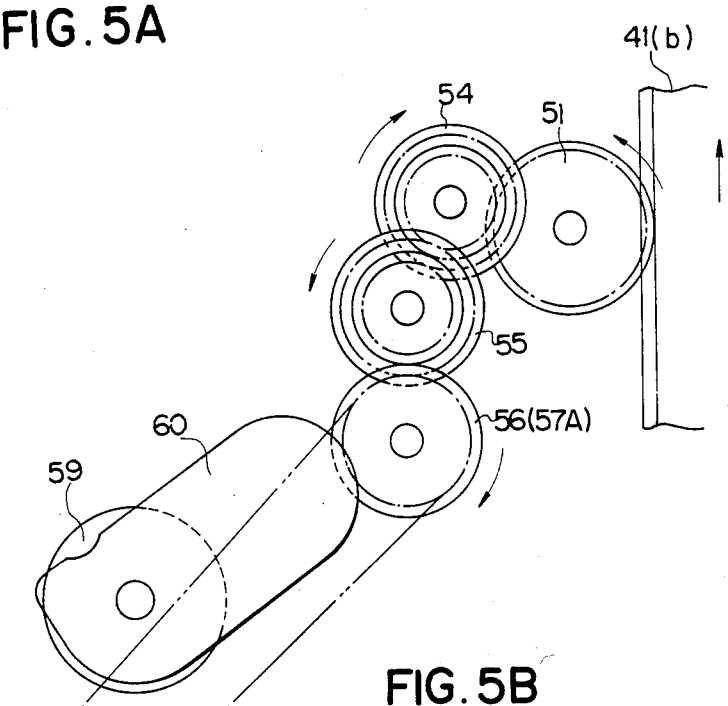
Figure 5B:
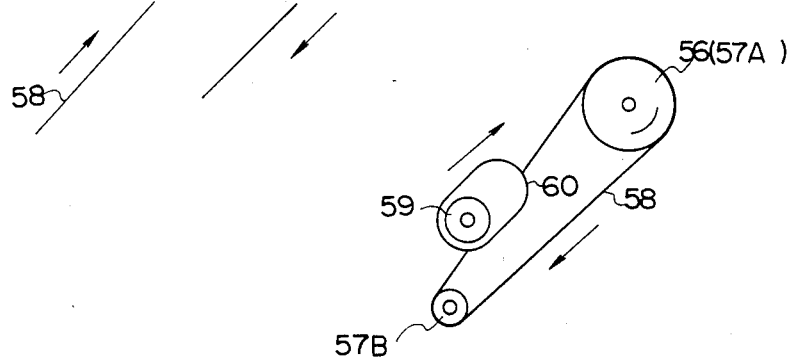
Figure 6:
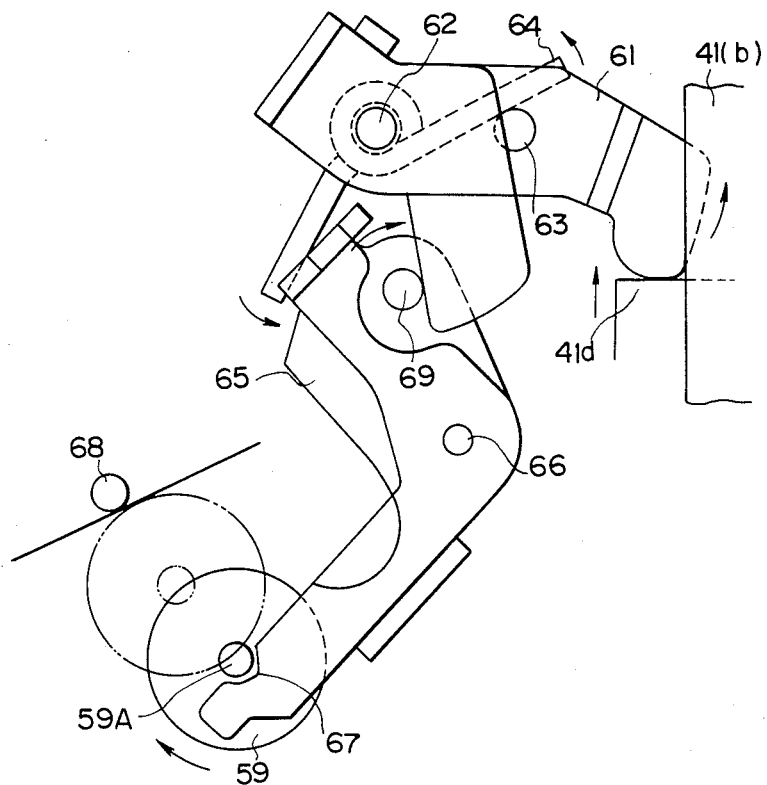

(2) Pinch Roller Mechanism B:

FIGS. 5(a), 5(b) and 6 are plan view of the pinch roller mechanism, including a right rack plate 41b, gears 51, 54, 55 and 56, pulleys 57A and 57B, a thread 58 used as a belt transmission member, a pinch roller 59, and a pinch roller plate 60 supporting the pinch roller 59.

When the rack plate 41 is pulled and moved upward responsively to start of rotation of the loading motor 5 as shown in FIG. 2, the upward movement is transmitted to the gear (intermittent gear) 51 to rotate it counterclockwise. The rotation of the gear 51 is transmitted to the gear 56 via the gears 54 and 55, so that the gear 56 rotates clockwise. The pulley 57A is integrally formed on the gear 56, and the thread 58 connects the pulley 57A to the other pulley 57B. The pinch roller plate 60 is fixed to the thread 58 and supports the pinch roller 59 rotatably. Therefore, when the gear 56 rotates counterclockwise, the pulley 57a also rotates counterclockwise, so that the thread 58 and the pinch roller 60 move together in a direciton shown by arrows in FIG. 5(b), carrying the pinch roller 59. When the pinch roller 59 reaches a predetermined position, it stops there regardless of further upward movement of the rack plate 41. When the rack plate 41 resumes its movement after the pause period T of FIG. 2, the projection 41d of the rack plate 41 contacts and elevates a pinch cam plate 61 as shown in FIG. 6, so that the pinch cam plate 61 rotates shaft 62 counterclockwise. Due to this, a pin 63 of the pinch cam plate 61 elevates one arm of a torsion spring 64 rotatably fixed to the plate 61, and the torsion spring 64 pushes a pinch push plate 65 already contacting the other arm thereof. The pinch push plate 65 is a member comprising two vertically spaced plates engageable with upper and lower end portions of the shaft 59A of the pinch roller 59 and is rotatable clockwise about a shaft 66. The upper and lower plate of the pinch push plate 65 are provided at corresponding end portions thereof with V-shaped notches 67 to properly guide the shaft 59A of the pinch roller 59. Thus the pinch push plate 65, when rotating clockwise, brings the pinch roller 59 into contact with a capstan shaft 68.

When the projection 41d stops at a position to maintain the pinch cam plate 61 elevated, the energy of the torsion spring 64 is transmitted to the pinch push plate 65, which in turn forcibly contacts at the notches 67 to the upper and lower ends of the shaft 59A so that the pinch roller 59 closely fit the tape to the capstan shaft 68.

To release the pinch roller 59 away from the capstan shaft 68, the rack plate 41 drops, the pinch cam plate 61 rotates clockwise with revival force of the torsion spring 64 to push the pin 69 provided on the pinch push plate 65, and the plate 65 rotates counterclockwise.

Figure 22:
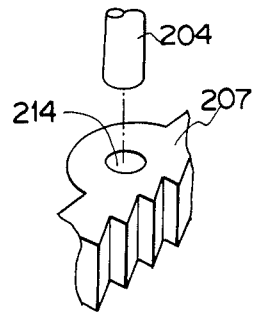
FIGS. 22 and 24(b) ar side views of the structures of FIGS. 21 and 24(a)
Figure 23:
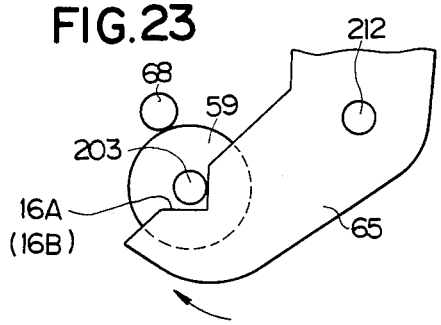
FIG. 23 is a perspective view of the modified pinch roller mechanism.
Figure 24:
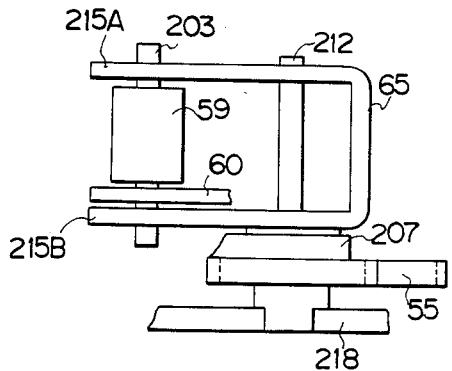

FIGS. 20 through 24 show detailed features of a modified pinch roller mechanism. Roller shaft 203 and 204 are fixed on a pinch roller plate 60 and rotatably support pinch rollers 59 and a preceding roller (tape guide roller) 206 as best shown in FIG. 22.

A flexible timing belt 207 in place of the thread 58 connects the pulleys 57A and 57B and has secured thereto the pinch roller plate 60. The timing belt 207 is provided with a hole 214 as shown in FIG. 22 to receive the roller shaft 204 to rotatably support the pinch roller plate 60 supported by the shaft 204.

As shown in FIGS. 24(a) and 24(b), a U-shaped pinch roller push member 65 is pivotably supported by a shaft 212 of the pulley 57A. Upper and lower plates 215A and 215B have V-shaped notches 216A and 216B to engagingly guide the shaft 203 of the pinch roller 59. Pulley shafts 212 and 213 are mounted on a chassis 218.

With this arrangement, assume now that a cassette tape is loaded in position, and the pinch roller 59 is located inside the tape. In recording or playback mode, rotation of the gear 55 is transmitted from the pulley 57A to the timing belt 207 to rotate the belt 207 clockwise as shown by an arrow. Concurrently, the pinch roller 60 is moved in the arrow direction, carrying the pinch roller 59 toward the capstan 68, and rotating about the roller shaft 204.

When the pinch roller 59 moves to a predetermined position, the gear 55 stops its rotation and maintains the pinch roller 59 immovable there. Concurrently, the pinch roller push member 65 rotates to and fro about the shaft 212 of the pulley 56 (57A), and the V-shaped notches 216A and 216B of the plates 215A and 215B guide the upper and lower ends of the shaft 203 of the pinch roller 59 at an adequate timing, so that the pinch roller 59 closely fits the capstan 68, interposing the tape therebetween. Thereafter, the close contact of the tape is maintained by an appropriate lock means to feed the tape in the playback or recording mode.

The use of the endless flexible transmission member for displacement of the pinch roller makes it possible to markedly reduce the necessary movement stroke of the pinch roller, and therefore reduce dead space in the system and the entire dimension of the system.

Additionally, the use of the endless flexible transmission member simplifies the structure, and facilitates maintainance and repairs of the system.

The endless flexible timing belt may be made of any suitable material such as rubber, metal, plastic, or their mixture.

(3) Reel Mechanism D:

FIGS. 7 and 8 illustrate the reel mechanism during FF/REW mode of FIG. 7 and PLAY mode of FIG. 8.

Responsively to the start of rotation of the loading motor 5, the right rack plate 41 moves upward, and rotates the cam gear 50, engaging therewith, in the counterclockwise direction. Concurrently, a pulley 70A engaging the gear 50 also rotates clockwise. This rotation is transmitted to a pulley 70B connected thereto via a timing belt 71. Since a friction rack 72 engages the pulley 70B, clockwise rotaion of the pulley 70B causes leftward movement of the friction rack 72.

This movement clockwisely rotates the pulley 73A engaging the friction rack 72, and the rotation is transmitted to the pulley 73B via a timing belt 74 in the same fashion as described. Subsequently, the rotation from the pulley 73 is transmitted to a left rack plate 76 via a cam gear 75. The left rack plate 76, responsively to the movement timing of the right rack plate 41, moves in the opposite direction, namely downward, in this case.

Above the friction rack 72 are provided plate cams 77A, 77B and 77C which are disposed in three levels as best shown in FIG. 7(b).

The plate cam 77A unlocks a reel lock mechanism provided behind a video cassette when the cassette is inserted in the cassette holder mechanism. The plate cam 77B establishes and cancels FF/REW mode. The plate cam 77C establishes and cancels PLAY mode. Various operations based upon these plate cams 77A, 77B and 77C are explained hereinbelow in sequence.

(a) Unlocking of Reel Lock Mechanism

Figure 9A:
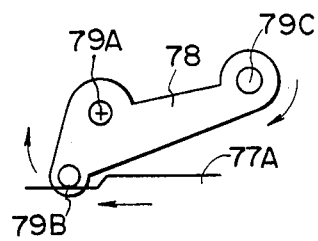

A plate 78 is provided adjacent to the plate cam 77A as best shown in FIGS. 9(a). The plate 78 has a pivotal support axle 79A at a central portion thereof and pins 79B and 79C at both ends thereof. When the friction rack 72 and plate cam 77A move together to the left, the pin 79B is elevated along a stepped portion of the plate cam 77A, so that the plate 78 rotates clockwise about the pin 79A and moves the pin 79C downward. Since the pin 79C is provided so as to locate behind the cassette, the pin 79C engages the reel lock mechanism behind the cassette and unlocks same.

Figure 9B:
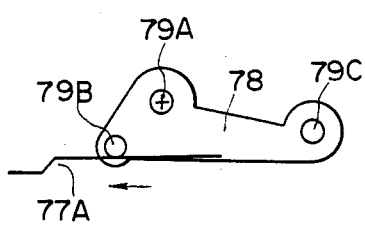

Thereafter, the reel lock mechanism is kept unlocked, and the plate 79 maintains the position of FIG. 9(b).

(b) FF/REW Mode

With a further movement of the friction rack 72, the cam gear 50 rotates a reel brake 80 counterclockwise about a shaft 81, and the cam gear 75 rotates a reel brake 82 clockwise about a shaft 83, so as to release reel bases 84 (supply) and 85 (take-up) from the reel brakes 80 and 82. The reel brakes 80 and 82 have rubber members B1 and B2 secured to their ends for contacting gear portions of the reel bases 84 and 85.

After the reel bases 84 and 85 are released from their brakes, the friction rack 72 stops.

Subsequently, a gear 86 integrally formed with the capstan shaft 68 is rotated counterclockwise together with the shaft 68 and the rotation is transmitted to a friction gear 89 via gears 86A, 87 and 88 to rotate same counterclockwise.

FIG. 7(c) is a side view of different gears in this state. Since the gear 88 engages a gear 89A of the friction gear 89, the rotation is transmitted to gear 89B. The gear 89B is opposed to a gear 89C via a felt pad 89D and closely pushed to same by a load from a push plate 89E and a conical spring 89F for the purpose of reducing changes in torque and rotational speed during high speed rotation in FF/REW mode.

THe gear 89C of the friction gear 89 engages a changeover gear 90 which is the upper member of a two-step structure including a lower member gear 101 (described later) and is rotatably supported on a friction gear plate 91.

When the gear 89C rotates counterclockwise, the plate 91 is pivoted clockwise about a pin 92, and the changeover gear 90 engages another friction gear 93 to rotate same counterclockwise.

The friction gear 93, when rotated, directly engages the gear portion of the reel base 85 as shown in FIG. 7(d) and rotates same clockwise, thereby establishing FF mode.

In REW mode of the system, the capstan shaft 68 and the gear 86 are rotated clockwise, and the changeover gear 90 engages a friction gear 94 opposite to the gear 93 and rotates the reel base 84 to rotate same counterclockwise, thereby establishing the REW mode. FIG. 7(a) shows FF mode.

(c) PLAY MODE

When the friction rack 72 moves to change the mode of the system from FF/REW to PLAY, only the take-up reel base 85 is braked by the reel brake 80.

Figure 10A:
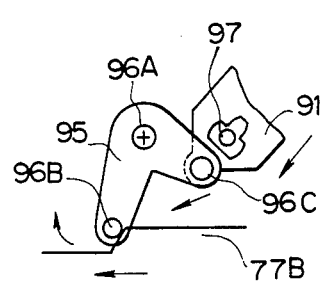

As shown in FIG. 10(a), a plate 95 is provided adjacent the plate cam 77B. The plate 95 has a central portion rotatably supported by a pin 96A, one end having a pin 96B and the other end having a pin 96C. The pin 96C fixes the friction gear plate 91 which supports the changeover gear 90. When the friction rack 72 moves to the left, followed by the plate cam 77C, the pin 96B is elevated by the step portion of the plate cam 77B, and the plate 95 is rotated clockwise about the pin 96A, bringing the friction gear plate 91 downward. In this state, relationship between a shaft 97 provided on the main chassis and a slot provided in the plate 91 locates the changeover gear 90 away from all friction gears 89, 93 and 94, thereby cancelling the FF/REW mode.

Figure 10B:
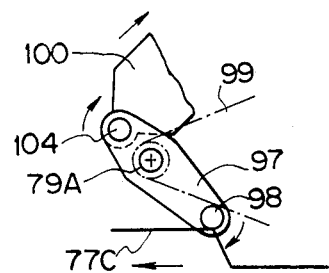

A plate 97 is provided adjacent the plate cam 77C (below the plate 91). The plate 97 has a pin 98 at one end thereof which maintains contact with the lateral edge of the plate cam 77C before the friction rack 72 moves. When the plate cam 77C also moves to the left as shown in FIG. 10(b) together with the friction rack 72, the step portion of the plate cam 77C reaches the pin 98 and allows the pin 98 to drop with energy of a torsion spring 99 coaxially provided with the pin 79A and to rotate the plate 97 clockwise about the pin 79A.

Therefore, a plate 100 (provided below the plate 91) rotates in a direction shown by arrows in FIG. 10(b), and a changeover gear 101 rotatably supported on the plate 100 engages the gear 89B of the gear assembly 89 just when the changeover gear 90 is disengaged from the friction gear 89.

After the changeover gear 101 engages the gear 89, the cam gear 50 is rotated counterclockwise to rotate the reel brake 80 counterclockwise again, so as to release the reel base 85 therefrom.

With further counterclockwise and clockwise rotations of the cam gear 50 and the cam gear 75, a winding preload 102 is rotated clockwise about the shaft 81, and a supply preload 103 is rotated counterclockwise about the shaft 83.

While the preloads 102 and 103 are rotated, felts BF1 and BF2 secured to end surfaces thereof are located apart from the reel bases 84 and 85, and therefore never give any load to the reel bases 84 and 85.

The friction rack 72 stops there.

With a subsequent counterclockwise rotation of the capstan shaft 68 and the gear 86, the rotation is transmitted to the gear 89A of the friction gear 89 similarly to the FF/REW mode, to rotate the gear 89A counterclockwise. Since the gear 89B is also rotated together with the gear 89A, the changeover gear 101 engaging therewith is rotated clockwise.

This causes the plate 100 to move about the pin 104 so that the changeover gear 101 engages and rotates counterclockwise a gear 93B of the friction gear assembly 93.

As described, the friction gear receives a predetermined load to reduce changes in torque and revolution speed.

The gear 93B rotates the gear 93A via a felt 93C, and the gear 93A rotates the reel base 84 clockwise to establish the play mode.

A reverse playback mode of the system is established by rotating the capstan shaft 68 and the gear 86 clockwise, so as to bring the changeover gear 101 into engagement with a friction gear assembly 94 and rotate the reel base 85 counterclockwise.

The friction gear assembly 94 has the same structure as the friction gear assembly 93, and transmits rotation from the changeover gear 101 in the same fashion.

FIG. 8(a) shows the PLAY mode.

(4) Tape loading Mechanism E:

FIGS. 11 through 17 illustrate the tape loading mechanism which pulls a length of a tape from a cassette and puts it along a tape path and the outer periphery of the rotary head.

Figure 11:
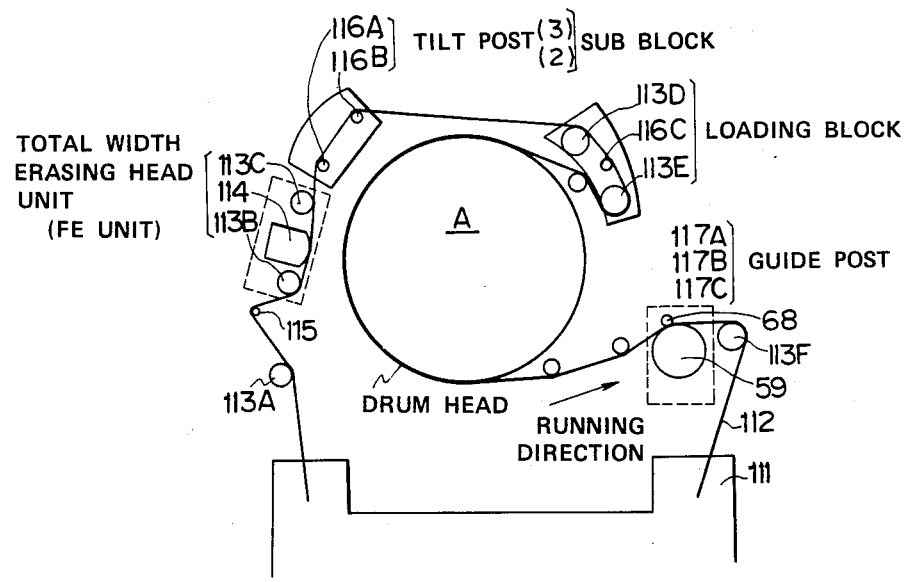
Figure 12:
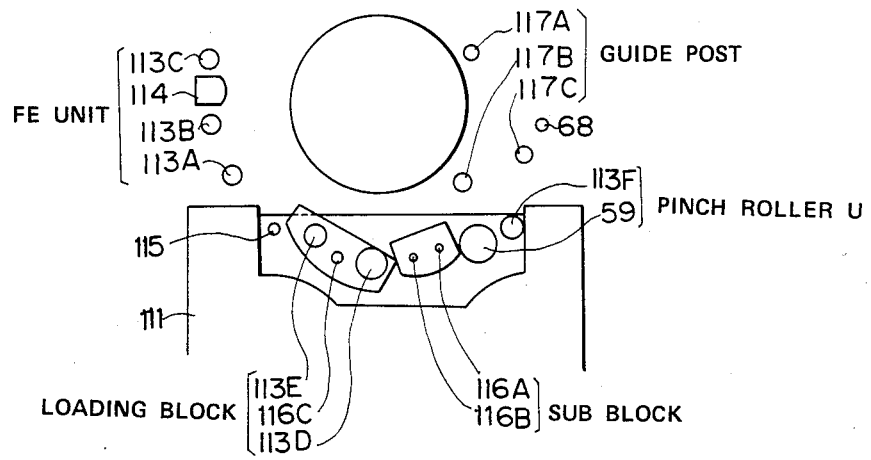

FIGS. 11 and 12 are simplified plan views of the mechanism upon completion of a tape loading operation or upon a tape unloading operation. FIGS. 11 and 12 show a video cassette 111, a tape 112, guide rollers 113A through 113F, a total width erasing head 114, a tension post 115, tilt posts 116A through 116C, guide posts 117A through 117C, a pinch roller 59, a capstan 68, and a rotary head A.

The total width erasing head 114 and guide rollers 113B and 113C at both sides of the erasing head 114 make a total width erasing head (FE) unit, while the tilt post 116C and the guide rollers 113D and 113E at both sides thereof constitue a loading block. Further, the tilt posts 116A and 116B make a sub block, whereas the guide roller 113E and the pinch roller 59 constitute a pinch roller unit. All members in one unit or block move integrally.

Before loading, the tension post 115, loading block LB, sub block SB and pinch roller unit PU are located within a limited area of the recorder to receive the front end of the cassette 111. However, when a loading is started, the loading block LB moves clockwise around the rotary head, pulling the tape, and the sub block SB follows the loading block LB a little later. Concurrently, the pinch roller unit PU moves counterclockwise. The tension post 115, however, maintains the position before the tape loading is completed.

When the rotary head is mounted with an inclination, a tape on the circumference of the rotary head will not be parallel to the end surface of the rotary drum at one or both of the entrance and exit ends of the length of the tape contacting the drum. If the recorder is designed to parallely maintain the exit end and not the entrance end, the thickness of the mechanism can be smaller. Any twist or inadequate height of the tape produced at the entrance end thereof due to the non parallel fitting is corrected by three tilt posts 116A through 116C in the loading block LB and sub block SB cooperating with the guide roller 113D located therebetween.

While the loading block LB initially pulls out the tape and puts it on the rotary head A, two guide rollers 113D and 113E maintain a proper height of the tape, and the tilt post 116C corrects a twist or inadequate height of the tape.

Figure 13:
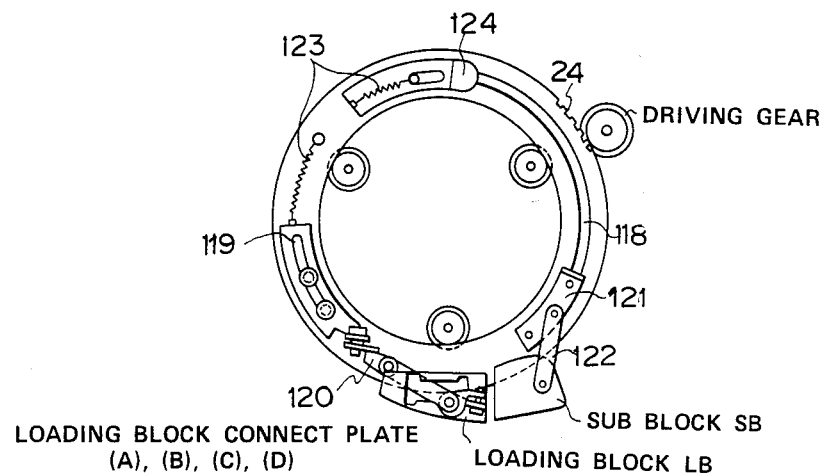

FIG. 13 illustrates a loading gear assembly for control of movements of the loading block LB and sub block SB. The assembly includes a ring-shaped loading gear 24, groove 118, loading block slide plate 119, loading block connect plate 120, sub block slide plate 121, sub block connect plate 122, overstroke pressure spring 123 and sub block push plate 124.

When the loading gear 24 rotates clockwise responsively to start of rotation of the loaeding motor 5, the loading block LB moves along the groove 118 on a rail 125, pulling the tape out of the cassette. The sub block SB remains there before the sub block slide plate 121 skids in the groove 118 up to a position where the sub block slide plate 121 hits the sub block push plate 124 at the terminal of the groove 118. When the sub block push plate 124 pushes the sub block slide plate 121, the sub block SB slides along the same orbit as the loading block LB, and both blocks simultaneously reach their respective positioning mechanisms. After this, the loading gear continues a predetermined overstroke rotation so that the overstroke pressure spring 123 reliably holds the both blocks in their proper positions.

After the sub block passes by the FE unit, the FE unit and the tension post 115 rotate up to a predetermined angular positions along an orbit which is determined by a cam follower of the FE unit slidably engaging a cam hole of the left rack plate 76.

Figure 14A:
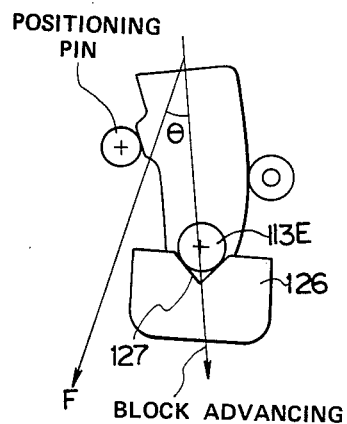
FIGS. 14(a) and (c) are fragmentary diagrams for a better explanation.

FIGS. 14(a) and (b) illustrate a mechanism for fixing the position of the loading block LB. The loading block LB moves along a rail 125 provided on the loading gear 24, and is fixed to a proper position by a V-shaped groove 127 receiving a portion coaxial with the guide roller 113E. For a more accurate transverse positioning of the loading block LB, an end surface thereof is engaged by a positioning pin 128. Since the loading block LB includes members to serve as perpendicular and tilt posts near the entrance of the rotary drum, its positional and other inaccuracies must be minimized.

In this positioning process, an arm connected to the loading gear pulls the loading block LB in a direction making θ degrees with respect to the actual moving direction of the loading block LB along the rail 125 for the purpose of the transverse positioning described above.

Figure 14B:
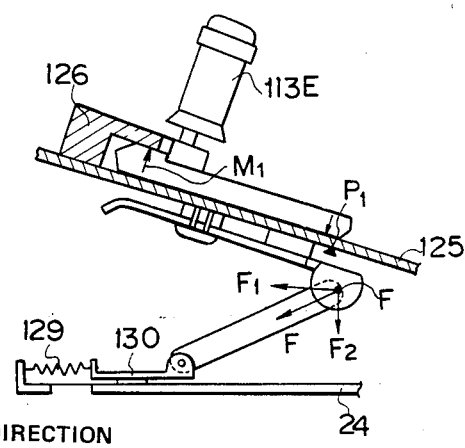

As shown in FIG. 14(b), where the front end of the loading block engagingly enters under the stopper, a plate 130 connected to the loading gear 24 by a spring 129 pulls a point P1 of the loading block LB with a force F, so that a moment M1 is produced about the point P1 to reduce backlash or looseness to a practically negligible quantity.

Figure 14C:
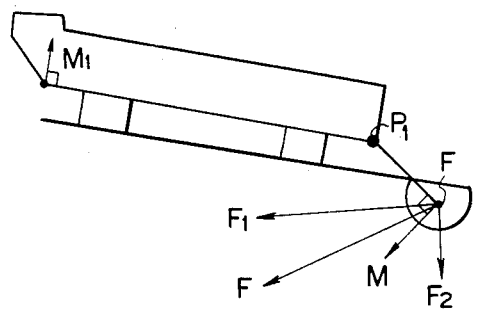
Figure 14D:
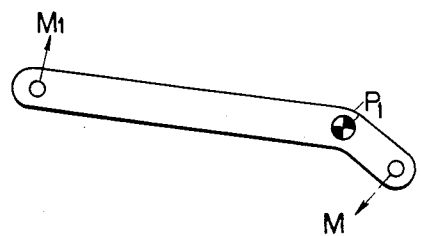

FIG. 14(c) illustrates a means which applies the force F to a rear position of the loading block to produce the moment M1 described above. The force F includes a component F2 depressing the block to the rail and a component F1 moving the block along the rail. Since the point P1 which receives the force F is positioned at the rear end of the loading blcok, the moment M1 serves to slightly raise the front end of the block.

FIG. 15 illustrates a mechanism for positioning the sub block SB. The sub block SB includes two tilt posts 116A and 116B which must be properly positioned and slanted to correct the height and twist of the tape.

Stoppers 127A and 127B are provided in positions not disturbing movement of the loading block but engageable with the sub block. The stoppers 127A and 127B and the force F hitting the sub block against the stoppers determine the position of the sub block in X-Y coordinates.

FIGS. 16(a) and (b) illustrate backlash or looseness preventing structures. The structure of FIG. 16(a) includes a pair of backlash or looseness preventing members provided at both sides of a rail 125 for travel of the sub block, so that a slight floating of the sub block SB above the rail 125 during positioning thereof is immaterial. The structure of FIG. 16(b) includes two blocks 129A and 129B sandwiching diagonal surfaces of the sub block and cooperating a spring 130 and a pusher plate 131 to produce the force F upwardly pushing the sub block. This structure can support the sub block with a force corresponding to a load from the stretched tape which might bias the sub block toward the drum during travel of the tape.

FIG. 17 illustrates a drive mechanism for moving the tension post 115 rotatable about the pin 115A. The tension post stands still inside the house of the cassette before the tape is loaded, because a tension cam 132 which supports the tension post 115 via a tension plate 134A abuts a tension drive plate 133 movable up and down integrally with the left rack plate 76. Since a tesnion plate 134B provided behind the main chassis engages a tension spring 135, the tension post is always rotatable in a direction shown by an arrow in FIG. 17. When the loading motor 5 in FIG. 3 starts rotating in these positional relationships of FIG. 17, and the right rack plate 41 is moved after the pause period of FIG. 2, the left rack plate 76 is concurrently moved in the opposite direction, i.e. downward. This causes the tension drive plate 133 to move so as to release the tension cam. Therefore the tension cam rotates about the pin 115A, and the tension post 115 moves to a given position. Thus the tape already pulled out of the cassette is stretched by the tension post 115 contacting the inner surface thereof.

When the rack plate 76 moves by a full length, one end of the tension drive plate 133 serves to stop a portion of the tension cam 132, so as to hold the tension post 115 at a predetermined position.

When the left rack plate 76 moves upward, a reverse motion is effected to bring the tension post 115 away from the tape. This is just the FF/REW mode of the system.

At one end of the left rack plate 76 is provided a mode switch controlled via a gear and generating an electric signal corresponding to a desired mode and responsive to the movement amount of the left rack plate 76.

Figure 18A:
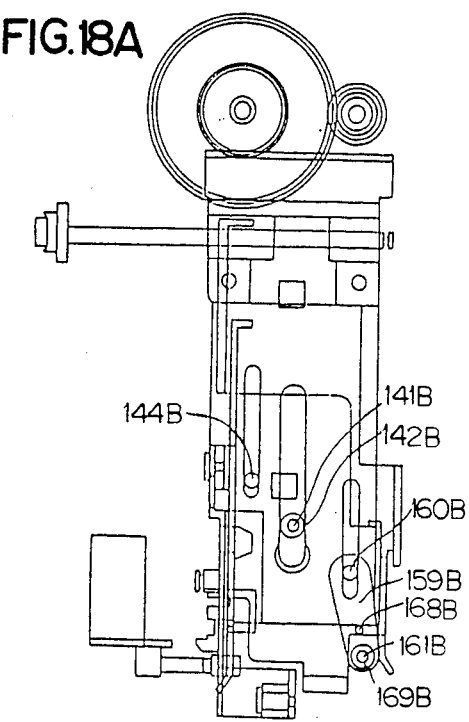
Figure 18C:
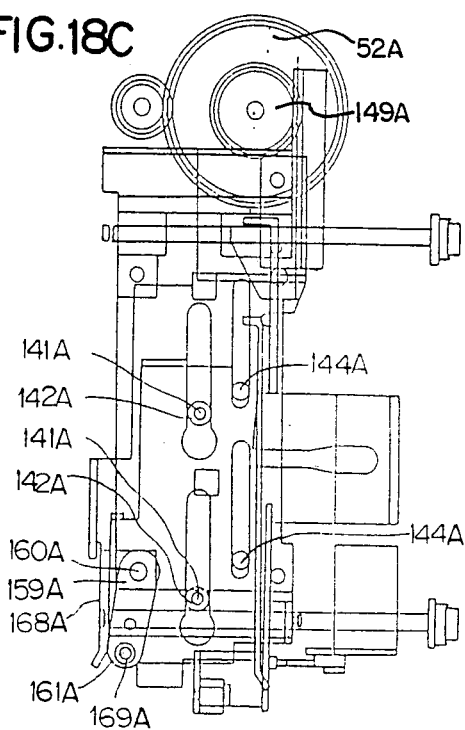
Figure 19A:
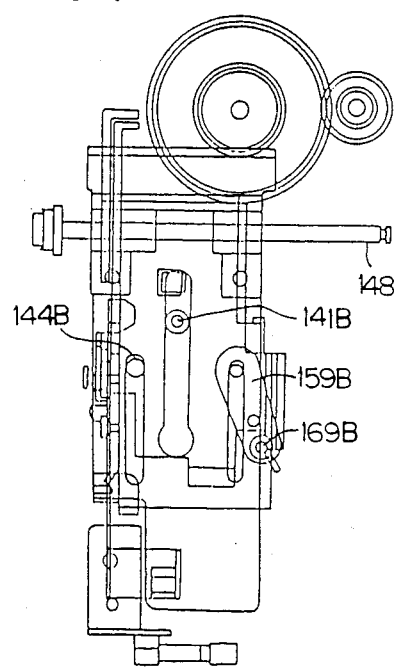
Figure 19C:
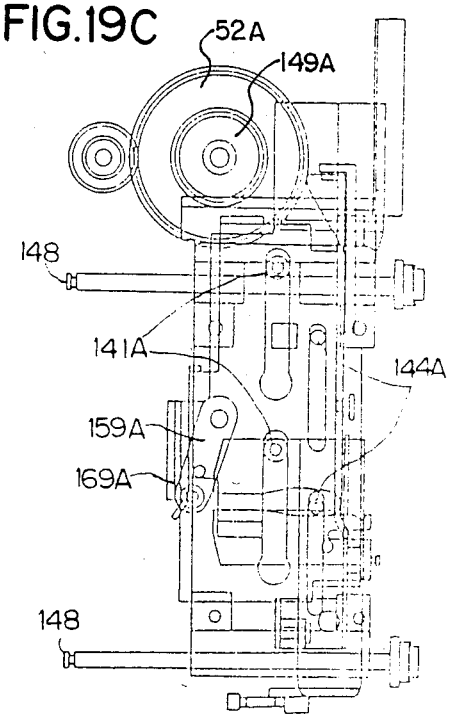
Figure 20:
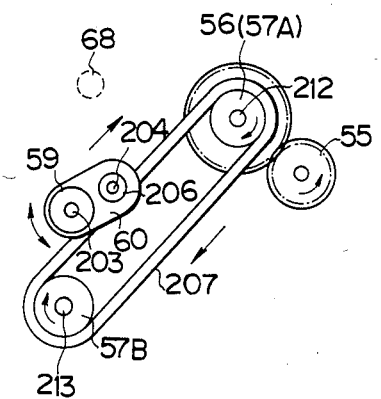
Figure 21:
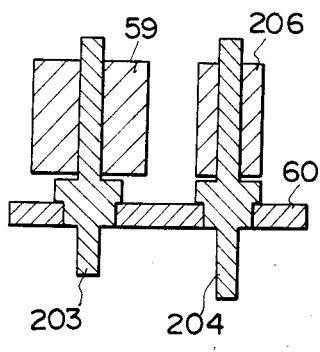
FIGS. 21 and 24(a) are plan views of a modified pinch roller mechanism in the present invention.

(5) Cassette Holder Mechanism C:

FIGS. 18 and 19 illustrate a cassette holder mechanism during cassette ejection (FIG. 18) and upon completion of cassette insertion (FIG. 19). FIG. 18(b) and FIG. 19(b) are plan views, FIG. 18(a) and FIG. 19(a) are left side views, and FIG. 18(c) and FIG. 19(c) are right side views.

A sub holder 140 is a box-shaped member to hold a video cassette therein. The sub holder 140 has two guide pins 141A on a right frame thereof and a guide pin 141B on a left frame thereof. The guide pins 141A and 141B are covered by bushes 142A and 142B and inserted in a horizontal guide hole of a main holder 143. More specifically, the sub holder 140 is encircled by the main holder 143, and the both holders are supported by the guide pins 141A and 141B for a limited, relative slidable movement in Y direction (in the depth direction).

The main holder 143 has two guide pins 144A on a right frame thereof and a guide pin 144B on a left frame thereof. The guide pins 144A and 144B are inserted in vertical guide holes formed in vertically movable plates 145A and 145B located at right and left sides of the main holder 143. Thus the main holder 143 is slidable by a predetermined stroke in Y direction.

The vertically movable plate 145A has a vertically movable rack 146A and a vertical slide guide 147A. The vertically movable plate 146B has a vertically movable rack 146B. The vertically movable racks 146A and 146B and the vertical slide guide 147A have holes and a groove, respectively, to receive three vertical movement guide pins 148 to support the vertically movable plates 145A and 145B slidably by given lengths in Z direction.

The use of three vertical movement guide pins 148 enables a proper support of the cassette holder to the main chassis without any inclination in X nor Y direction. With this structure, the sub holder 140 cam move with respect to the main chassis in Y and Z directions.

A back and forth movable rack 150 is mounted at one end of the main holder 143, and a vertical movement drive gear 149A is provided at a position for engagement with the back and forth movable rack 150 and the vertically movable rack 146A. The vertical movement drive gear 149A comprises three-step gears, two of which are engageable with the back and forth movable rack 150 and the vertically movable rack 146A. Each of the two gears includes a cam portion and gear portion to provide an intermittent gear transmission between the racks 150 and 146A. The intermittent gear mechanism causes the vertically movable rack 150, i.e. the main holder 143 to effect an intermittent motion of pause-movement-pause in Y direction in response to rotation of the vertical movement drive gear 149A.

Similarly, in response to rotation of the vertical movement drive gear 149A, the vertically movable rack 146A, i.e. the vertically movable plate 146A effects an intermittent motion of pause-movement-pause in Z direction.

Another vertical movement drive gear 149B is provided at a position for engagement with the vertically movable rack 146B. The vertical movement drive gear 149B comprises two-step gears one of which includes a cam portion and a gear portion for intermittent gear engagement with the vertically movable rack 146B. The intermittent gear mechanism causes the vertically movable rack 146B to effect an intermittent motion in Z direction of pause-movement-pause in response to rotation of the vertical movement drive gear 149B.

A coupler shaft 151 carries a pair of gears 152A and 152B at both ends thereof for coupling the right and left gear assemblies. The gears 152A and 152B are engageable with the vertical driving three-step gear 149A and the other step of the vertical driving two-step gear 149B to establish an integral rotation of the vertical movement drive gears 149A and 149B at the right and left.

Reference numerals 153A and 153B denote a pair of rack holder plates. The plate 153B is mounted on the main holder 143 for rotation on Z-Y surface about a pin 154, and normally biased by a spring inwardly. THe plate 153B has a cam end surface depressed to a pin 155B on the sub holder 140. A lid lock release plate 156 is supported on the sub holder 140 by a pin 157 for rotation about the pin 157 on X-Y surface and for movement in Y direction. The lid lock release plate 156 has an engage member 156T at one end thereof for engagement with an elongated hole 140N of the sub holder 140. A spring biases the plate 156 clockwise, and a guide hole 156N is pressed to the pin 157.

An arm of the pack holder plate 153B is located at a position for engagement with an engage member 156S of the lid lock release plate 156 in Z direction to serve as a stopper when an external force tends to rotate the pack holder plate 153B outwardly.

The pack holder plate 153 A on the right frame of the sub holder 140 is supported on the main holder 143 rotatably about a pin 158 on X-Y surface, and is biased by a spring inwardly. A cam end surface of the pack holder plate 153A is pressed to a pin 155A on the sub holder 140.

With the mechanism described above, the cam configurations of the pack holder plates 153A and 153B ensure Y direction movements of the pins 155A and 155B of the sub holder 140. Therefore, the sub holder 140 reliably moves in Y direction with respect to the main holder 143.

Rack push plate 160A and 160B are supported on both side surfaces of the sub holder 140 rotatably on Y-Z surface, and is biased clockwise by a spring.

The rack push plates 159A and 159B have pins 161A and 161B which engage side ends of the sub holder 140 to serve as stoppers before a video cassette is inserted. They also have pack push rollers 169A and 169B which engage the upper surface of the video cassette during insertion thereof to push the cassette in Z direction.

When a cassette is received in the sub holder 140, the engage member 156T of the lid lock release plate 156 enters in a slit between the body and lid of the cassette. The engage member 156T thereafter moves along the side wall of the cassette, and pushes a lid lock release lever to release the lid lock. With a further inward movement of the cassette, the lid lcok release lever of the cassette pushes and moves the lid lock release plate 156. Since the engage member 156S of the release plate 156 moves together, the stopper mechanism of the rack holder plate 153B is released.

Regardless of insertion of a video cassette in the sub holder 140, the sub holder 140 does not move unless the front end of the cassette engages the engage members 165A and 165B of the sub holder 140 for the reason described above. After the engage member 165A and 165B abut the front end of the cassette, pushing force is increased. When this force exceeds the counter force of the pin 155A and 155B on the plates 153A and 153B, the sub holder 140 starts moving together with the cassette.

When the sub holder 140 moves together with the cassette to a position where the engage members 165A and 165B abut engage members 164A and 164B of the main holder 143, a pair of rollers 162A and 162B of the pack holder plates 153A and 153B enter in changer grip portions at both side walls of the cassette so as to fix positions of the video cassette and the sub holder with respect to the main holder 143. After this, the main holder moves together with the sub holder.

Responsively to the fixture of the above-described positional relationship, right and left detection switches 163A and 163B detect this condition and are changed from "on" to "off", for example, to supply a signal to the loading motor. Responsitvely to the signal, the vertical movement drive gears 149A and 149B receive power and move the cassette first in Y direction and next in Z direction.

The movement is maintained before the vertical movement drive gears 149A and 149B rotate a predetermined angle, and subsequent operations are effected thereafter.

More specifically, the intermittent gear mechanism moves the main holder 143 in Y direction by a predetermined stroke, and maintains it there. After this, the vertically movable plates 145A and 145B move in Z direction by a predetermined stroke, and are maintained there. Therefore, the main holder 143, sub holder 140 and video cassette also move first in Y direction and next in Z direction, so that the positioning pins on the main chassis enter in the positioning holes of the cassette to fix the position of the cassette.

During ejection of the cassette, reverse operations are effected. During ejection, the eject rack 36 and eject rack engage plate 37 as shown in FIGS. 3 and 4 are used. (See the latter half of the description in Paragraph (1) above).

As described above, the invention provides a video tape recorder comprising:

(A) a rotary head;
(B) a pinch roller mechanism driven by a first drive source to closely engage a tape running from the rotary head;
(C) a cassette holder mechanism receiving a video cassette and driven by the first drive source to bring the cassette to a predetermined position;
(D) a reel mechanism driven by a second drive source to drive a tape in a selected mode;
(E) a tape loading mechanism for pulling the tape out of the video cassette and putting it along a tape path including the circumferential periphery of the rotary head; and
(F) a timing control mechanism driven by the first drive source to control when to activate different members of the system.

Therefore, the invention enables reduction in size and weight of the video tape recorder. This improvement never requires any expensive parts or elements which might increase the manufacturing cost.

The invention will be particularly effective when used in a 8 mm video recorder. However, it is available for other uses.

The embodiments of the invention in which an exclusive property or privilege is claimed are defined as follows:

1. A cassette tape reproducing apparatus driving power changeover mechanism comprising:
   a reversable rotary driving source;
   a major power transmission mechanism connected to said driving source;
   and movable in response to said driving source to produce a driving power;
   a cassette loading mechanism responsive to movement of said power transmission mechanism for loading or unloading a cassette to or from a predetermined reproducing position;
   a first subordinate power transmission mechanism for transmitting said driving power from said major power transmission mechanism to said cassette loading mechanism;
   a tape loading mechanism responsive to movement of said power transmission mechanism for partly pulling out the tape from a cassette into a predetermined tape path and retracting said tape therefrom;
   a second subordinate power transmission mechanism for transmitting said driving power from said major power transmission mechanism to said tape loading mechanism; and
   a driving power switching mechanism including a sun gear reversibly driven by the driving power from said major power transmission mechanism and a satellite gear engaging said sun gear for movement therearound, means for selectively moving said satellite gear between a first position for engagement with said first subordinate power transmission mechanism and a second position for engagement with said second subordinate power transmission mechanism, wherein at least one of said first and second subordinate power mechanisms is disposed for grazing tangential engagment by said satellite gear so that release of said satellite gear from engagement with said one of said subordinate power mechanisms will allow it to move therepast to engage the other of said subordinate power mechanisms.

2. The power changeover mechanism of claim 1 wherein said satellite gear is supported on an arm member which is pivotally supported in a coaxial relationship with said sun gear, said driving power switching mechanism including means for urging said arm member to rotate in the rotational direction fo said sun gear, said first and second subordinate power transmission mecahnisms each having associated therewith a releasable switching member which is movable between an intercepting position with said arm member for preventing rotation of said arm member and a releasing position allowing said arm member to rotate, said first and second subordinate power transmission mechanisms selectively receiving said driving power when the associated one of said switching members interceptingly contacts said arm member and prevents said arm member from further rotation so that said satellite gear is held in engagement with a selected one of said first and second subordinate power transmission mechanisms.

3. The power changeover mechanism of claim 1 wherein said first and second subordinate power transmission mechanisms have first and second rotary gears respectively which are selectively engageable with said satellite gear, each of said first and second subordinate power transmission mechanisms having associated therewith a switching pin respectively, each of said switching pins being respectively moved by a predetermined amount of rotation of said first and second gear to move its associated switching member to said releasing position to release said arm member and thereby selectively interrupt power transmission to said first and second subordinate power transmission mechanisms.

* * * * *